July 6, 1965    E. FOUGEA    3,192,594
MOLD FOR THE FABRICATION OF MOLDED CONCRETE PANELS
Filed Nov. 1, 1962    2 Sheets-Sheet 1
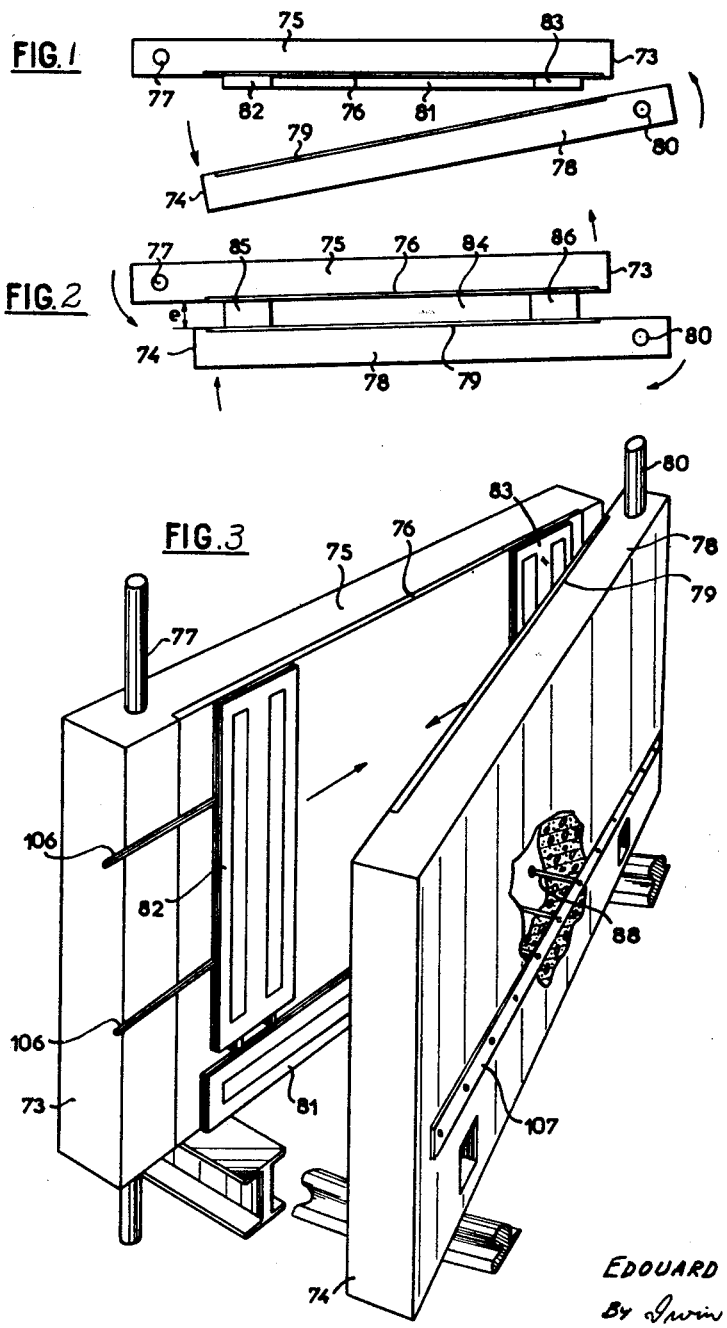
INVENTOR
EDOUARD FOUGEA
By Irwin L. Thompson
ATTY.

July 6, 1965  E. FOUGEA  3,192,594

MOLD FOR THE FABRICATION OF MOLDED CONCRETE PANELS

Filed Nov. 1, 1962  2 Sheets-Sheet 2

INVENTOR
EDOUARD FOUGEA
BY Irwin S. Thompson
ATTY.

United States Patent Office 3,192,594
Patented July 6, 1965

3,192,594
MOLD FOR THE FABRICATION OF MOLDED
CONCRETE PANELS
Edouard Fougea, Neuilly-sur-Seine, France, assignor to
Constructions Edmond Coignet, Paris, France, a corporation of France
Filed Nov. 1, 1962, Ser. No. 234,689
Claims priority, application France, Nov. 14, 1961,
878,829
3 Claims. (Cl. 25—121)

The present invention relates to the construction of buildings of pre-fabricated elements of concrete, and it is more particularly directed to a method of manufacture of these elements.

In order to ensure rapid construction of buildings, it has been proposed to prefabricate, with equipment specially designed and adapted for that purpose, large elements of concrete having very precise dimensions, this precision being of the same order as that of mechanical construction, and subsequently to assemble these elements directly together by juxtaposition and super-imposition, without skeleton framework. In this technique, in order to obtain the required accuracy without subsequent shrinking of the concrete, the molding of the elements is carried out in molds with double walls heated by circulation of steam or other hot fluid. The molding is effected in the mold arranged horizontally, but the demolding is effected in the position which the element will have in the building, that is to say, in the case of the more important elements such as walls and partitions, in the vertical positon. De-molding in the vertical position thus necessitates a rotation of the mold through 90°. This rotation results in a complication of the equipment.

The present invention relates to molding apparatus which facilitates handling and makes molding more rapid, while simplifying molds and the method of their use.

This apparatus is characterized in that the molding of the concrete elements is effected in the same vertical position which they will have in the building for which they are intended, in a mold having at least one movable wall, the inner sides of the walls of the mold being provided with electrically conductive metal plates which are connected to a source of electrical supply in order to provide the heating of the molded element.

Thus, instead of molding while flat in a horizontal mold, the molding is carried out upright in a vertical mold, the concrete being poured in the same manner as for a bottom casting. The concrete is made with a fluidity appropriate to this kind of utilization.

In the vertical mold thus constituted, at least one of the walls is movable in the horizontal direction, perpendicular to its plane, in order to permit de-molding of the pre-fabricated element. This mobility is also of advantage for the production of elements of different thicknesses.

The heating of the molded element in order to accelerate its setting and to stabilize its hardening, instead of being carried out by circulation of steam or other heated fluid, is obtained by the heating effect of the passage of an electric current through the mass of concrete during the molding operation. To this end, the walls of the mold which correspond to the faces of the molded element are formed by electrically-conducting plates, the mountings of which are insulated from the remainder of the mold. The input current terminal or terminals are arranged on the plates forming electrodes in such manner as to obtain a uniform distribution of current through the mass of concrete, this current utilizing the Joule effect to cause uniform acceleration of the phenomenon of setting and hardening.

The mold is closed at the bottom and on the sides between the vertical walls by movable edges so as to permit the lengths of the molded elements to be varied in accordance with the requirements of the construction. The same apparatus can thus be employed for elements of different lengths and height, according to the requirements of the construction. In co-operation with the mobility of one of the walls or of the two walls, these edges can be of various thicknesses.

The apparatus in accordance with the invention and its application will be described in more detail with reference to the accompanying drawings, in which:

FIGS. 1 to 3 represent a form of mold with pivoted walls.

Figure 4:
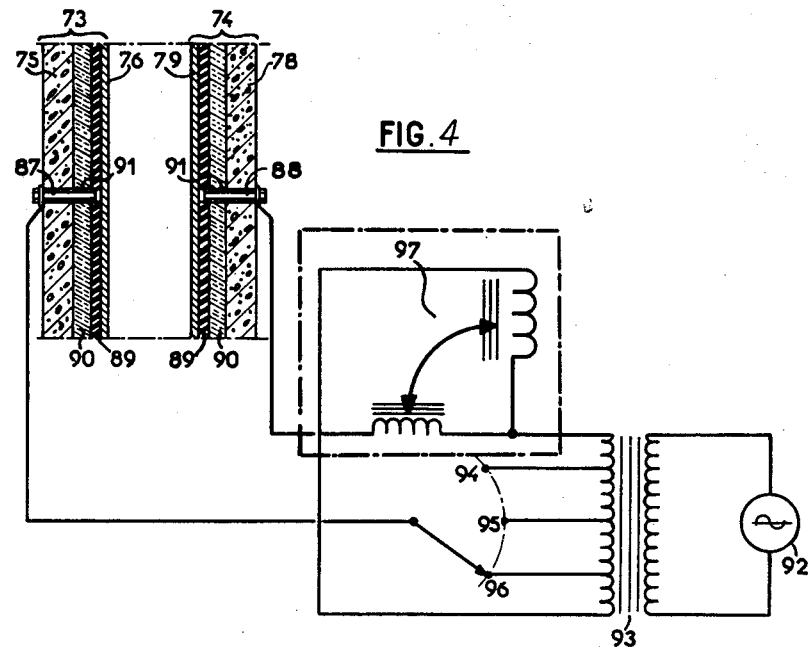
FIG. 4 shows the detail of the supply of electric current to the mold.

The mold illustrated in FIGS. 1 and 2 is composed of two vertical panels 73 and 74. The panel comprises a frame 75 carrying an internal plate 76 of conductive metal, steel for example. This panel rests on the ground through the intermediary of sliding shoes. It is mounted on a shaft 77 located at one of the extremities of the frame 75.

The panel 74 similarly comprises a frame 78 with an internal conducting plate 79. It is pivotally mounted on a vertical shaft 80 arranged at the extremity of the frame 78 on the opposite side to the shaft 77 of the panel 73.

Between the two panels 73 and 74 are arranged a lower sill 81 and lateral borders 82 and 83. This sill and these borders are preferably fixed to one of the plates, 76 for example, by a double-acting elector-magnet. Their height is the same as that of the piece of concrete to be molded. The borders 82 and 83 can be moved by rods 106 or other appropriate means.

In the closed position, the panels 73 and 74 are placed opposite each other, their faces 76 and 79 being parallel and maintained at the distance desired by the members 81 to 83. The whole assembly is held in position by the fixing means, in particular by the clamping action of electro-magnets, which ensure at the same time fluid-tightness of the mold. When the article is molded, the mold is opened by pivoting the panel 74 about its axis.

In order to vary the thickness of the object molded, it is only necessary to modify the position of the panel 73, by rotation about the shaft 77. By bringing the panel 74 into parallel relation with the panel 73 (see FIG. 2), there is obtained a thickness spacing e which is as large as may be desired, the cheeks 84 and borders 85 and 86 being made appropriately to correspond to that thickness.

With this mold, it is furthermore possible to produce pieces of more or less pronounced trapezoidal shape.

If holes or passages are to be reserved in the molded element, this reservation is ensured by mandrels or appropriate parts of electrically insulating and compressible material, such as neoprene. These parts, provided with a permanent magnet, are applied at the desired place on one of the plates. Upon the closure of the mold they are compressed and held in position during the molding operation.

In order to ensure the hardening of the concrete, the latter is heated in the mold by the Joule effect right through the centre of the molded mass which is still moist. To this end, the plates 76 and 79 constituting the inner wall of the mold, are connected to the electric generator by rods 87 and 88 (FIG. 3) passing through the frames 75 and 78 of the panels.

Each of the conductive plates 76 and 79 is placed on the corresponding frame 75, 78 before the interposition of a layer of electrical insulation 89 and a layer of heat insulation 90. The rods 87 and 88 are arranged in tubes of electrical insulating material 91 (see FIG. 4). The rods 87 and 88 are connected together by a conducting bar 107 (see FIG. 3) which is connected to the current supply source.

The heating current is supplied by any desired source 92 of alternating current. For example, the source 92 supplies a transformer 93 having a plurality of secondary contacts 94, 95 and 96, with a voltage regulator 97.

Experience has shown that excellent results are obtained with a current of about 90 amperes per square metre of element molded, for a concrete having a ratio of water to cement in the vicinity of 0.50. The hardening of the concrete accelerated by the heating is then sufficient to permit of de-molding after about one hour's heating. The choice of the supply voltage will depend on the natural resistance of the concrete, that is to say on its content of water and on the thickness to be passed through. For a concrete of the quality indicated above, there is provided a tension of about 7 volts per centimetre of thickness.

It follows from the above indications that for parts having a size up to 20 square metres of surface area with thicknesses of 20, 10 and 6 centimetres, substantial power must be available, which leads to the use of high voltage alternating current. For example, with a current supply of 15,000 volts there is provided a transformer 93 of 250 kva. with a 15,000 volt primary and a secondary with three contacts 94, 95 and 96 respectively at 140, 70 and 42 volts capable of an output of 1800 amperes. The voltage is regulated to ±10 volts by the regulator 97 in order to adapt the rate of heating to the resistivity of the molded element. In practice, it is attempted to obtain a uniform increase in temperature in order to reach 90° C. in one hour.

Figure 5:
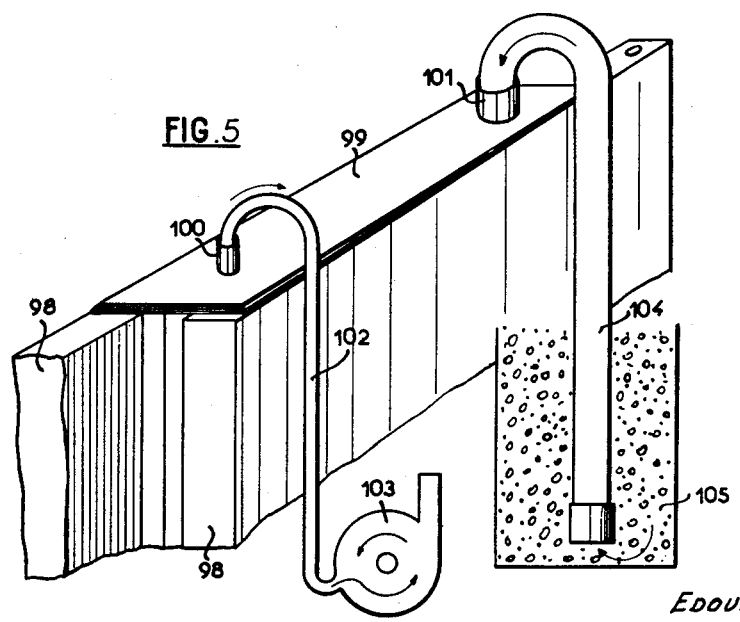
FIG. 5 represents an alternative method of introducing the concrete into the mold.

Provision may be made for introducing the concrete into the lower part of the mold by the "bottom casting" method. Another method of operation consists in effecting this introduction by suction at the upper part of the mold, the latter being put under vacuum. As shown in FIG. 5, the vertical walls of the mold 98 are provided at their upper portion with a closure plate 99. This plate 99 comprises two openings 100 and 101. The opening 100 is put into communication by a pipe 102 with the suction of a vacuum pump 103. The opening 101 is connected by a conduit 104, acting as a siphon, to a tank of concrete 105.

It can be seen that when the vacuum pump 103 creates a vacuum in the mold, the concrete is sucked into the mold and pours into it so as to fill it.

What I claim is:
1. A mold for the fabrication of molded concrete panels, said mold comprising two vertical walls, means mounting said vertical walls for horizontal swinging movement about vertical axes, one of said walls having its pivot axis adjacent one extremity thereof, the other of said walls having its pivot axis adjacent the other extremity thereof with respect to the extremity of the pivot of said one of said walls, the relative positions of the two pivot axes of said walls permitting a variation in the thickness of the concrete receiving space between said walls while permitting said walls to be maintained parallel to one another, and a bottom and end pieces interposed in the space between said walls for determining the dimensions of the edges and the bottom of the panel to be molded.

2. A mold as claimed in claim 1, and electrically conductive metal plates covering the interior surfaces of said walls, means for connecting said plates to an electrical current source, said bottom and end pieces being held on said walls by electromagnetic force.

3. A mold as claimed in claim 1, and an upper closure member for said mold, a concrete supply connected to said upper closure member, and a vacuum source connected to said upper closure member.

References Cited by the Examiner

UNITED STATES PATENTS

| | | | |
|---|---|---|---|
| 832,404 | 10/06 | McDonald | 25—121 |
| 903,916 | 11/08 | Tegarden | 25—121 |
| 1,492,642 | 5/24 | Lake. | |
| 2,048,253 | 7/36 | Freyssinet. | |
| 2,128,336 | 8/38 | Torstensson. | |
| 2,416,559 | 2/47 | Wilson. | |
| 2,500,866 | 3/50 | Ramsay | 264—27 |
| 2,524,419 | 10/50 | Billner | 264—90 XR |
| 2,672,664 | 3/54 | Sudziarski. | |
| 2,717,436 | 9/55 | LeTorneau | 25—131 |
| 2,841,856 | 7/58 | Gelbman | 264—27 |
| 2,870,517 | 1/59 | Henderson | 25—131 |
| 3,030,688 | 4/62 | Tumey | 25—121 |
| 3,075,240 | 1/63 | Casavina et al. | 25—121 |
| 3,081,488 | 3/63 | Casavina et al. | 25—121 |

FOREIGN PATENTS

| | | |
|---|---|---|
| 1,222,825 | 1/60 | France. |
| 1,228,439 | 3/60 | France. |
| 6,495 | 2/03 | Great Britain. |
| 136,220 | 1961 | Russia. |

WILLIAM J. STEPHENSON, *Primary Examiner.*
ALEXANDER H. BRODMERKEL,
          ROBERT F. WHITE, *Examiners.*